United States Patent
Fox et al.

(10) Patent No.: US 9,791,031 B2
(45) Date of Patent: Oct. 17, 2017

(54) DIFFERENTIAL HAVING COMPACT BEVEL CROSS SHAFT RETENTION USING CASE BOLTS AND ADJACENT SHAFTS

(71) Applicant: Eaton Corporation, Cleveland, OH (US)

(72) Inventors: Matthew G. Fox, Ceresco, MI (US); Jeffrey A. Oesch, Roseville, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/613,948

(22) Filed: Feb. 4, 2015

(65) Prior Publication Data
US 2017/0114881 A1    Apr. 27, 2017

Related U.S. Application Data (63) Continuation of application No. 14/049,513, filed on Oct. 9, 2013, now Pat. No. 8,951,159.
(Continued)

(51) Int. Cl.
*F16H 48/08*  (2006.01)
*F16H 48/40*  (2012.01)
(Continued)

(52) U.S. Cl.
CPC .............. *F16H 48/08* (2013.01); *F16H 3/54* (2013.01); *F16H 37/082* (2013.01); *F16H 48/22* (2013.01);
(Continued)

(58) Field of Classification Search
CPC ........ F16H 48/08; F16H 48/40; F16H 57/037; F16H 2048/087
(Continued)

(56) References Cited

U.S. PATENT DOCUMENTS

| | | |
|---|---|---|
| 5,897,453 A | 4/1999 | Mimura |
| 6,063,000 A | 5/2000 | Sugimoto |
| (Continued) | | |

FOREIGN PATENT DOCUMENTS

| | | |
|---|---|---|
| EP | 0182936 | 6/1984 |
| GB | 1312720 | 4/1973 |
| (Continued) | | |

OTHER PUBLICATIONS

English translation of JP2008045644A, translationportal.epo.org, May 26, 2017.*

*Primary Examiner* — Roger Pang
(74) *Attorney, Agent, or Firm* — RMCK Law Group, PLC (57) ABSTRACT

A differential gear mechanism constructed in accordance to one example of the present disclosure can include a differential casing having a first case housing portion and a second case housing portion. The first and second case housing portions can be coupled together with fasteners. A first and a second side gear can be rotatably mounted within the differential casing. A plurality of pinion gears can be mounted between the first and second side gears. Each of the plurality of pinion gears can be rotatably mounted on a respective pinion gear shaft. Each pinion gear shaft can have first and second ends. The first end of each pinion gear shaft can be aligned with a fastener of the plurality of fasteners such that axial movement of the respective pinion gear shafts is inhibited by contact with a corresponding fastener of the plurality of fasteners.

9 Claims, 12 Drawing Sheets

Related U.S. Application Data (60) Provisional application No. 61/712,239, filed on Oct. 10, 2012, provisional application No. 61/843,592, filed on Jul. 8, 2013, provisional application No. 61/843,623, filed on Jul. 8, 2013, provisional application No. 61/870,832, filed on Aug. 28, 2013.

(51) Int. Cl.
| | | |
|---|---|---|
| *F16H 3/54* | (2006.01) | |
| *F16H 48/22* | (2006.01) | |
| *F16H 37/08* | (2006.01) | |
| *F16H 57/037* | (2012.01) | |
| *F16D 13/52* | (2006.01) | |

(52) U.S. Cl.
CPC ........... *F16H 48/40* (2013.01); *F16H 57/037* (2013.01); *F16D 13/52* (2013.01); *F16H 2048/087* (2013.01)

(58) Field of Classification Search
USPC ........................................ 475/230; 74/606 R
See application file for complete search history.

(56) References Cited

U.S. PATENT DOCUMENTS

| | | | |
|---|---|---|---|
| 6,238,315 | B1 | 5/2001 | Morse |
| 6,293,891 | B1 | 9/2001 | Irwin et al. |
| 7,695,392 | B2 | 4/2010 | Isken et al. |
| 7,758,462 | B2 | 7/2010 | Veldman et al. |
| 7,942,780 | B2 | 5/2011 | Donofrio |
| 8,544,174 | B2 | 10/2013 | Isken, II et al. |
| 8,591,375 | B2 | 11/2013 | Maruyama et al. |
| 2005/0009662 | A1* | 1/2005 | Sudou ..................... F16H 48/08 475/231 |
| 2010/0029434 | A1* | 2/2010 | Nakajima ............... F16H 48/08 475/230 |
| 2010/0323840 | A1 | 12/2010 | Radzevich et al. |
| 2013/0225356 | A1 | 8/2013 | Tanaka et al. |

FOREIGN PATENT DOCUMENTS

| | | | |
|---|---|---|---|
| GB | 2237853 | 5/1991 | |
| JP | 2008045644 A | * 2/2008 | ............. F16H 48/08 |

* cited by examiner

DIFFERENTIAL HAVING COMPACT BEVEL CROSS SHAFT RETENTION USING CASE BOLTS AND ADJACENT SHAFTS

CROSS-REFERENCE TO RELATED APPLICATIONS

This application is a continuation of U.S. patent application Ser. No. 14/049,513, filed on Oct. 9, 2013, which claims the benefit of U.S. Provisional Application No. 61/712,239 which was filed on Oct. 10, 2012, U.S. Provisional Application Nos. 61/843,592 and 61/843,623, which were filed on Jul. 8, 2013, and U.S. Provisional Application No. 61/870,832 filed Aug. 28, 2013. The disclosures of each of the above applications are incorporated herein by reference in their entirety.

FIELD

The present disclosure relates generally to differential gear assemblies and more particularly to a differential gear case arrangement for retaining cross shafts of the differential.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure can include a differential casing defining first and second output shaft openings that are coaxially aligned along an axis of rotation of the differential casing. The differential casing can have a first case housing portion and a second case housing portion. The first and second case housing portions can be coupled together with fasteners. A first and a second side gear can be rotatably mounted within the differential casing. The first and second side gears can be co-axially aligned along the axis of rotation of the differential casing. The first side gear can define a first shaft opening configured to provide a first torque transmitting connection with a first output shaft received within the first output shaft opening. The second side gear can define a second output shaft opening configured to provide a second torque transmitting connection with a second output shaft received within the second output shaft opening. A plurality of pinion gears can be mounted between the first and second side gears. Each of the plurality of pinion gears can be rotatably mounted on a respective pinion gear shaft. Each pinion gear shaft can have first and second ends. The plurality of pinion gears can intermesh with the first and second side gears to form a torque transfer arrangement configured for transferring torque between the pinion gears and the first and second side gears to rotate the first and second side gears about the axis of rotation. The torque transfer arrangement can also be configured for allowing the first and second side gears to rotate at different rotational speeds with respect to one another about the axis of rotation. The first end of each pinion gear shaft can be aligned with a fastener of the plurality of fasteners such that axial movement of the respective pinion gear shafts is inhibited by contact with a corresponding fastener of the plurality of fasteners.

According to additional features, each pinion gear shaft can be aligned for engagement with an adjacent pinion gear shaft at the second ends. The plurality of fasteners can comprise a plurality of bolts each having a threaded shaft and a head portion. The second ends of the pinion gear shafts can be aligned with the head portion of the respective bolts. The plurality of fasteners can extend along respective fastener axes. The pinion gear shafts can extend along respective pinion gear shaft axes. The fastener axis and the pinion gear shaft axis of each corresponding aligned fastener and pinion gear shaft can be perpendicular.

According to other features, each second end of the pinion gear shafts can be beveled. The pinion gear shafts can comprise three pair of pinion gear shafts. Each pair of pinion gear shafts can include first and second pinion gear shafts that are coaxial relative to each other. At least one of the pinion gear shafts can have a groove formed along an outer circumferential surface. Each pinion gear shaft can have at least one groove formed along an outer circumferential surface.

A differential gear mechanism constructed in accordance to additional features can include a differential casing defining first and second output shaft openings that are coaxially aligned along an axis of rotation of the differential casing. The differential casing can have a first case housing and a second case housing. The first and second case housings can be coupled together with a plurality of fasteners. A first and a second side gear can be rotatably mounted within the differential casing. The first and second side gears can be co-axially aligned along the axis of rotation of the differential casing. The first side gear can define a first shaft opening configured to provide a first torque transmitting connection with a first output shaft received within the first output shaft opening. The second side gear can define a second output shaft opening configured to provide a second torque transmitting connection with a second output shaft received within the second output shaft opening. A plurality of pinion gears can be mounted between the first and second side gears. Each of the plurality of pinion gears can be rotatably mounted on a respective pinion gear shaft. The plurality of pinion gears can intermesh with the first and second side gears to form a torque transfer arrangement configured for transferring torque between the plurality of pinion gears and the first and second side gears to rotate the first and second side gears about the axis of rotation. A piston housing can be disposed in the differential casing adjacent to one of the first and second side gears.

According to additional features, the piston housing can be a case wall for one of the first and second side gears. The piston housing can be a case wall for the plurality of pinion gears. The differential gear mechanism can further comprise a piston. The piston housing can be disposed intermediate the piston and one of the first and second side gears. The piston housing can further comprise a housing body including an outer annular flange, and inner annular flange and a collar disposed intermediate the outer and the inner annular flanges. The outer and inner annular flanges can be concentric.

According to other features, the piston housing can further comprise an outer ring, an inner ring and a connecting surface that connects the outer ring and the inner ring. The outer ring and the inner ring can be parallel. The inner ring can include grooves formed thereon. The grooves can be configured to facilitate fluid transfer along a surface of the inner ring. A washer can be disposed between the inner ring of the piston housing and one of the first and second side gears.

A differential gear mechanism constructed in accordance to additional features of the present disclosure can include a differential casing that defines first and second output shaft openings that are coaxially aligned along an axis of rotation of the differential casing. The differential casing can have a first case portion and a second case portion. The first case portion can define a plurality of bores therein. A first and a second side gear can be rotatably mounted within the differential casing. The first side gear can define a first shaft opening configured to provide a first torque transmitting connection with a first output shaft received within the first output shaft opening. The second side gear can define a second output shaft opening configured to provide a second torque transmitting connection with a second output shaft received within the second output shaft opening. A plurality of pinion gears can be mounted between the first and second side gears. Each of the plurality of pinion gears can be rotatably mounted on a respective pinion gear shaft. The plurality of pinion gears can intermesh with the first and second side gears to form a torque transfer arrangement configured for transferring torque between the pinion gears and the first and second side gears to rotate the first and second side gears about the axis of rotation. A plurality of pins can be received in the corresponding plurality of bores in the first differential case portion. The pins can be aligned with the pinion gear shafts thereby inhibiting movement of the pinion gear shafts out of the differential casing.

According to additional features, the pins can be separately formed and distinct from the second differential case portion. The second case portion can be selectively coupled to the first case portion by fasteners thereby capturing the pins and the pinion gear shafts.

BRIEF DESCRIPTION OF THE DRAWINGS

The present disclosure will become more fully understood from the detailed description and the accompanying drawings, wherein.

DETAILED DESCRIPTION

Figure 1:
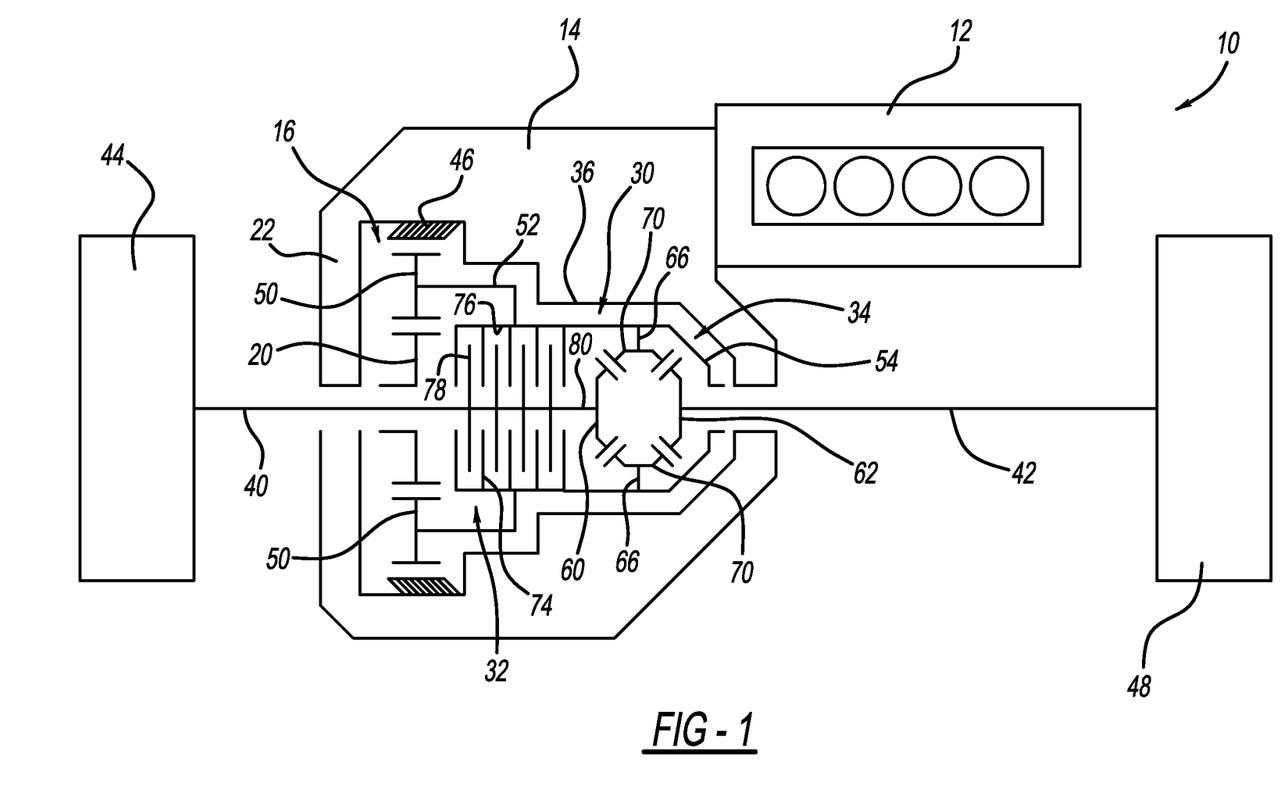
FIG. 1 is schematic of an exemplary vehicle driveline incorporating a differential gear mechanism constructed in accordance to one example of the present disclosure.

With initial reference to FIG. 1, an exemplary vehicle driveline is shown and generally identified with reference numeral 10. The exemplary vehicle driveline 10 described herein is for a front wheel drive vehicle having a transversely mounted engine 12, although other configurations can be utilized with the present disclosure. The engine 12 provides a rotary output to a transmission 14.

The driveline 10 can further include a transaxle 22 and a limited slip differential assembly 30 having a planetary gear assembly 16, a clutch assembly 32 and a differential gear assembly or mechanism 34. The limited slip differential assembly 30 is received in a housing 36 and operates to drive a pair of axle shafts 40 and 42 that are connected to front drive wheels 44 and 48, respectively. In general, the limited slip differential assembly 30 functions as a traditional open differential during normal operating conditions until an event occurs where a bias torque is required. When a loss in traction is detected or anticipated, the clutch assembly 32 can be selectively actuated in order to generate the optimum bias ratio for the situation.

The transmission 14 can receive the rotary output from the engine 12 and provide a rotary input to the limited slip differential assembly 30. Further, the transmission 14 can be operable to provide various gear ratios between the rotary output of the engine 12 and the rotary input of the limited slip differential assembly 30.

The planetary gear assembly 16 includes a ring gear 46, a sun gear 20 and a plurality of planet gears 50 carried by a planet carrier 52. The ring gear 46 is non-rotatably fixed to the housing 36, and the sun gear 20 is meshingly engaged with the plurality of planet gears 50 carried by the planet carrier 52. The planet gears 50 are meshed with the ring gear 46. The planet carrier 52 is coupled for rotation with a differential case 54 of the differential gear assembly 34. The planetary gear assembly 16 provides a gear ratio reduction from the sun gear 20 to the planetary carrier 52 and, therefore, to the differential case 54. The sun gear 20 is rotatably coupled to the transmission 14 via a coupling device, such as a chain or belt, such that an output of the transmission 14 drivingly rotates the sun gear 20, which translates rotational output from the transmission 14 into rotational input of the sun gear 20.

Figure 3:
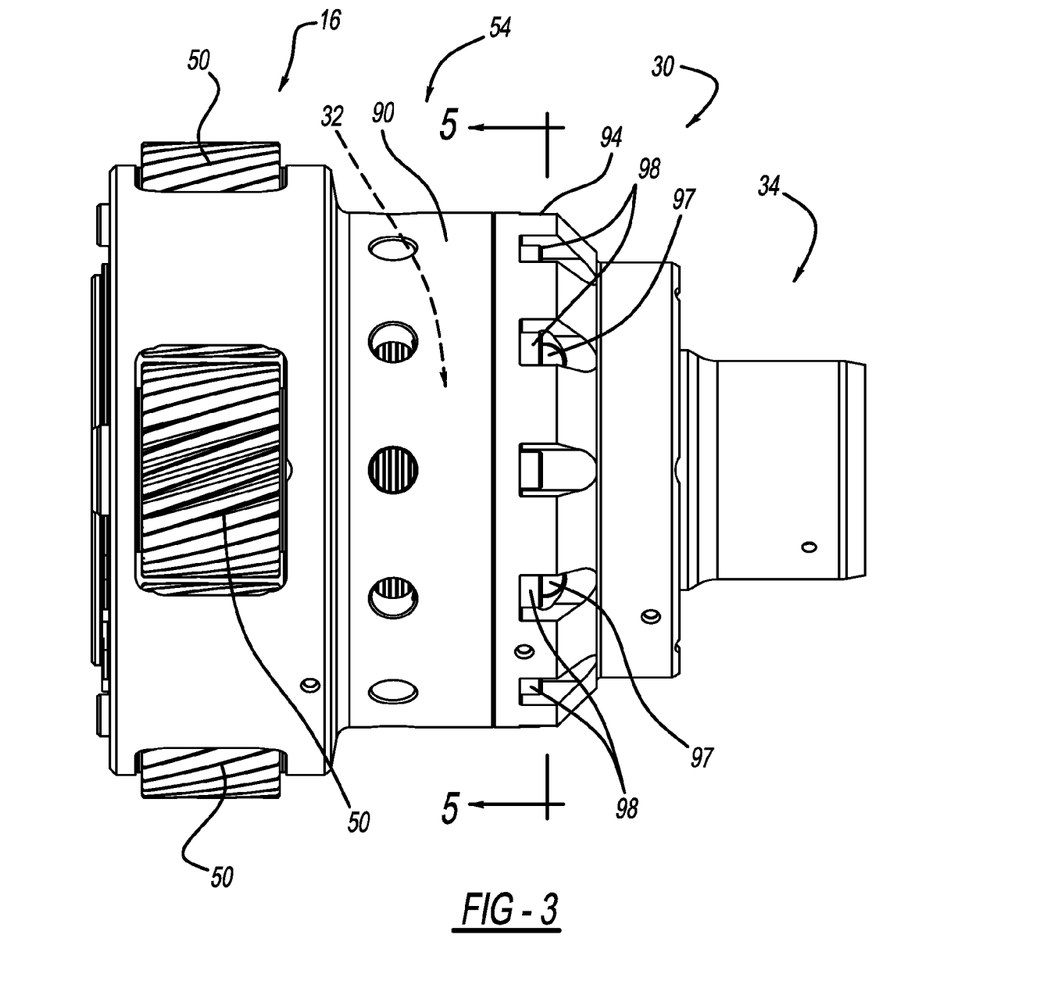
FIG. 3 is a side view of the limited slip differential assembly of FIG. 2.
Figure 4:
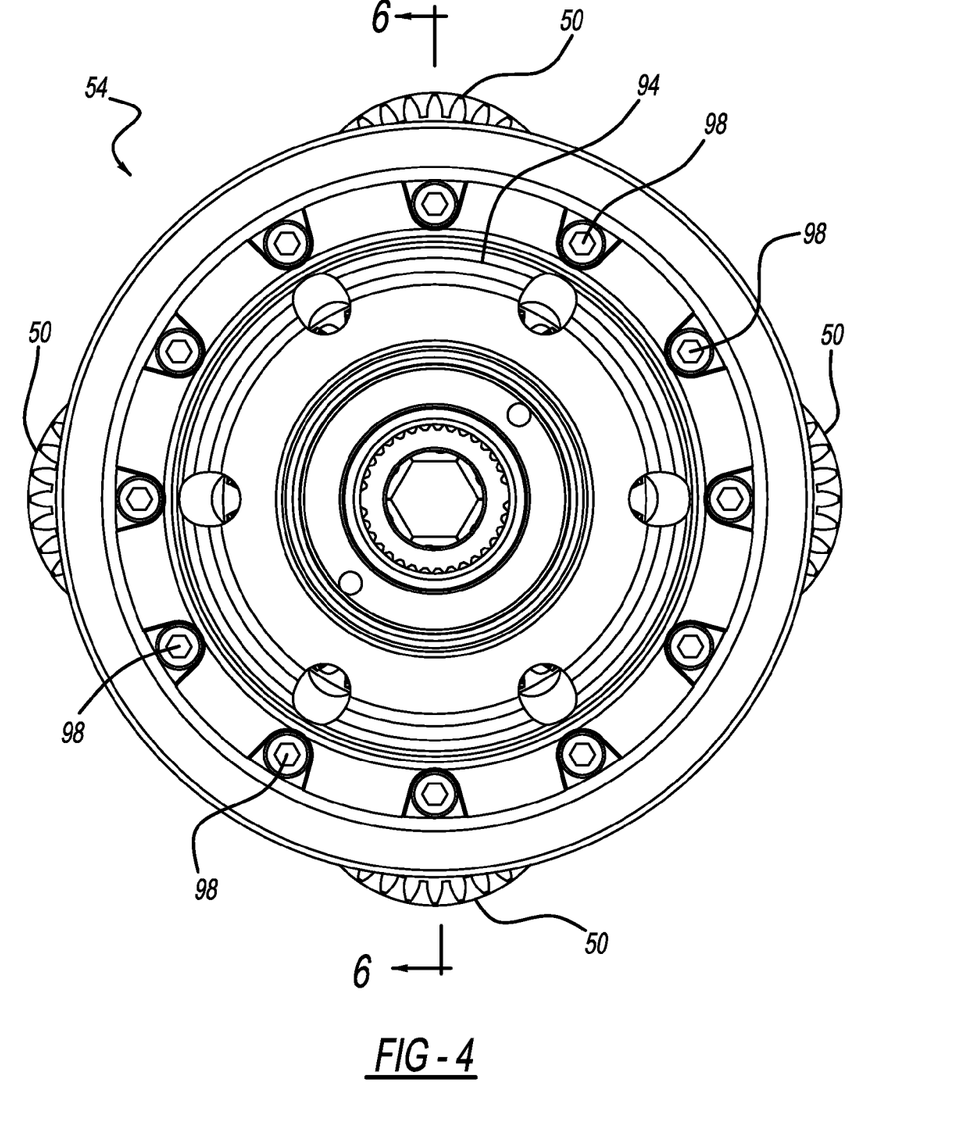
FIG. 4 is an end view of the limited slip differential assembly of FIG. 2.

The differential gear assembly 34 includes a pair of side gears 60 and 62 that are mounted for rotation with the axle shafts 40 and 42 (and first and second drive wheels 44 and 48), respectively. The side gears 60 and 62 define first and second axle shaft openings 64 and 65 (FIG. 3). A plurality of cross pins or pinion gear shafts 66 are fixedly mounted to the differential case 54 for rotation therewith. A corresponding plurality of pinion gears 70 are mounted for rotation with the pinion gear shafts 66 and are in meshing relationship with both of the side gears 60 and 62. In an open configuration, described more fully below, the differential gear assembly 34 acts to allow the axle shafts 40 and 42 to rotate at different speeds.

The clutch assembly 32 couples the planetary gear assembly 16 with the differential gear assembly 34. The clutch assembly 32 includes a clutch pack 72 and a clutch actuator 73. The clutch pack 72 includes a plurality of annular plates 74 interleaved between a plurality of annular friction disks 78. The plurality of annular plates 74 can be coupled for rotation with one of the differential case 54 and the differential gear assembly 34. The plurality of annular friction disks 78 can be coupled for rotation with the other one of the differential case 54 and the differential gear assembly 34. In the illustrated embodiment, the plurality of annular plates 74 are coupled for rotation to the differential case 54 (e.g., splined to an inner diameter 76 of the differential case 54) and the plurality of annular friction disks 78 are coupled for rotation with the differential gear assembly 34 (e.g., splined to an outer diameter 80 of the side gear 60). It will be appreciated that the annular friction disks 78 may be supported for rotation by either of the side gears 60 or 62, or both.

The plurality of annular plates 74 and annular friction disks 78 are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates 74 and annular friction disks 78 have absolutely no contact when the clutch assembly 32 is in the open condition. The annular plates 74 and annular friction disks 78 are axially movable into frictional engagement relative to one another, thereby reducing relative rotation between the annular plates 74 and annular friction disks 78 when the clutch assembly 32 is in the closed or partially closed configurations. In this manner, when the clutch assembly 32 is in its closed position, the side gears 60 and 62, as well as the axle shafts 40 and 42 and the drive wheels 44 and 48 rotate together.

The clutch assembly 32 can operate in an open configuration to allow the side gears 60 and 62 to rotate independently from each other, e.g., at different speeds. The clutch assembly 32 can also operate in a closed or partially closed configuration where the side gears 60 and 62 rotate together or partially together (that is, not independently), e.g., at substantially the same speed. The clutch assembly 32 can, for example, be a hydraulic clutch assembly 32 that utilizes pressurized hydraulic fluid that can act on a piston 82 to selectively actuate the clutch pack 72 between the open, closed and partially closed configurations.

Figure 2:
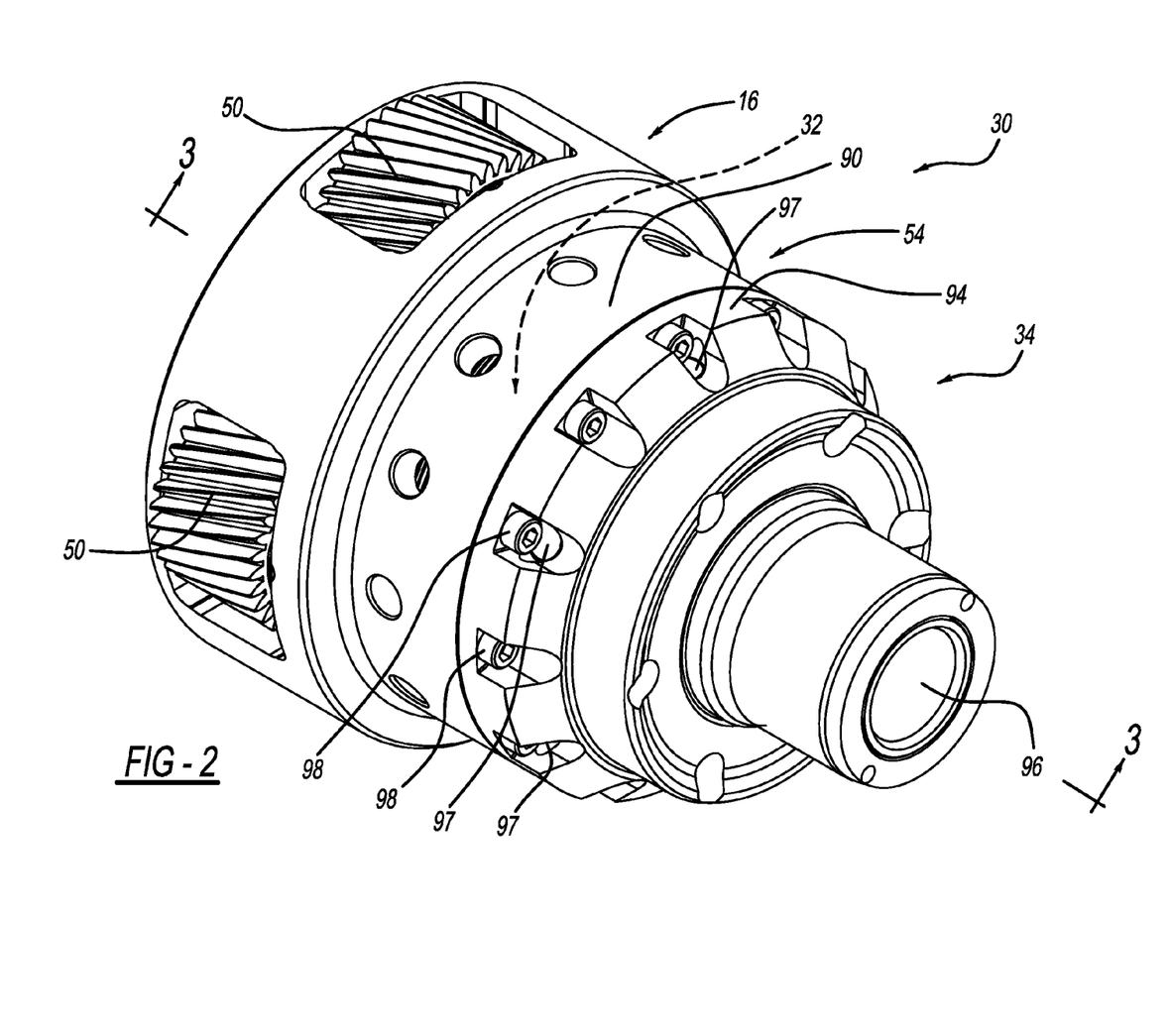
FIG. 2 is perspective view of a limited slip differential assembly 30 incorporating a differential gear mechanism constructed in accordance to one example of the present disclosure.
Figure 5:
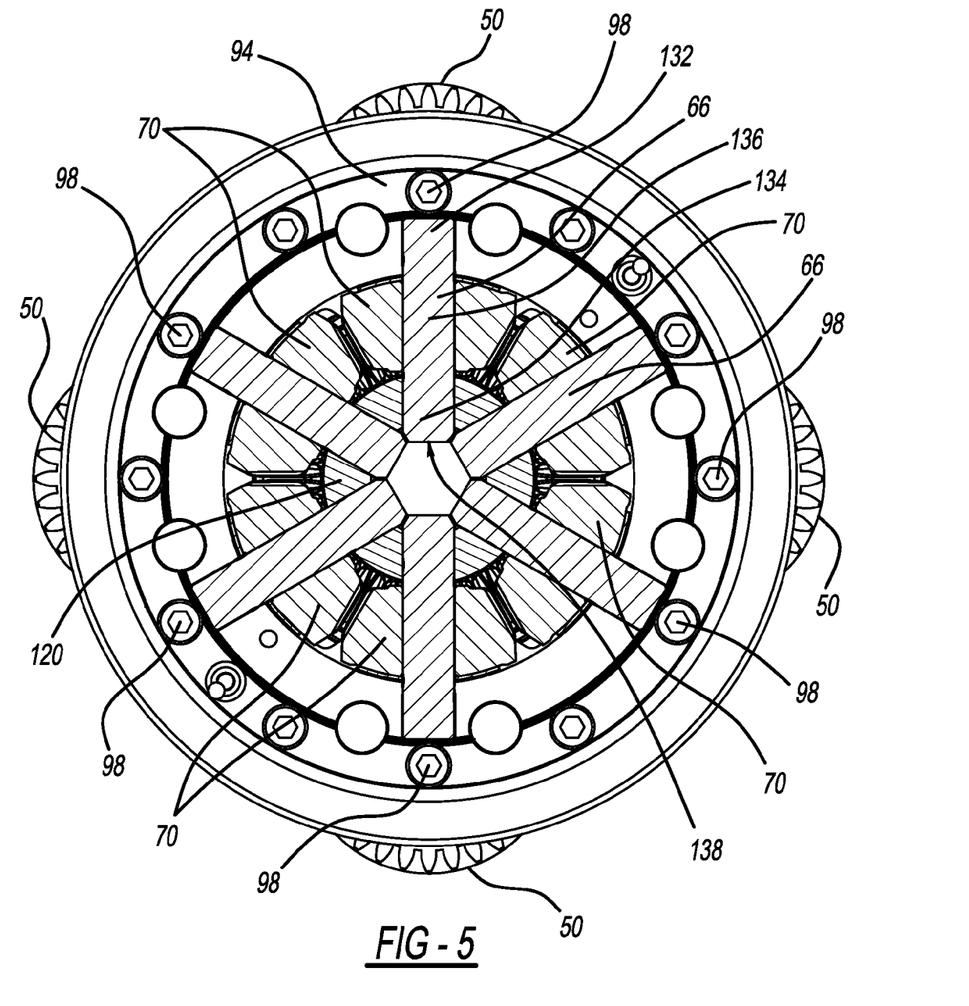
FIG. 5 is a sectional view of the limited slip differential taken along lines 5-5 of FIG. 3.

With additional reference now to FIGS. 2-6, additional features of the differential gear assembly 34 will be described. The differential case 54 can include a first differential case portion 90 that defines a first output shaft opening 92 (FIG. 6) and a second differential case portion 94 that defines a second output shaft opening 96 (FIG. 2). A plurality of cross bores 97 can be defined through the second differential case portion 94. The cross bores 97 can be configured to receive the pinion gear shafts 66 during assembly. Subsequent to insertion of the pinion gear shafts 66 though the cross bores 97, the first and second differential case portions 90 and 94 can be coupled together by a plurality of fasteners 98. In the example shown, the fasteners include hex bolts although other configurations are contemplated. As illustrated in FIG. 5, each pinion gear shaft 66 is aligned with a fastener 98 such that radial movement of the respective pinion gear shafts 66 is inhibited by contact with a corresponding fastener 98. Each fastener 98 can extend along a fastener axis 100 (FIG. 6) and include a threaded shaft portion 102 and a head portion 104.

Figure 7:
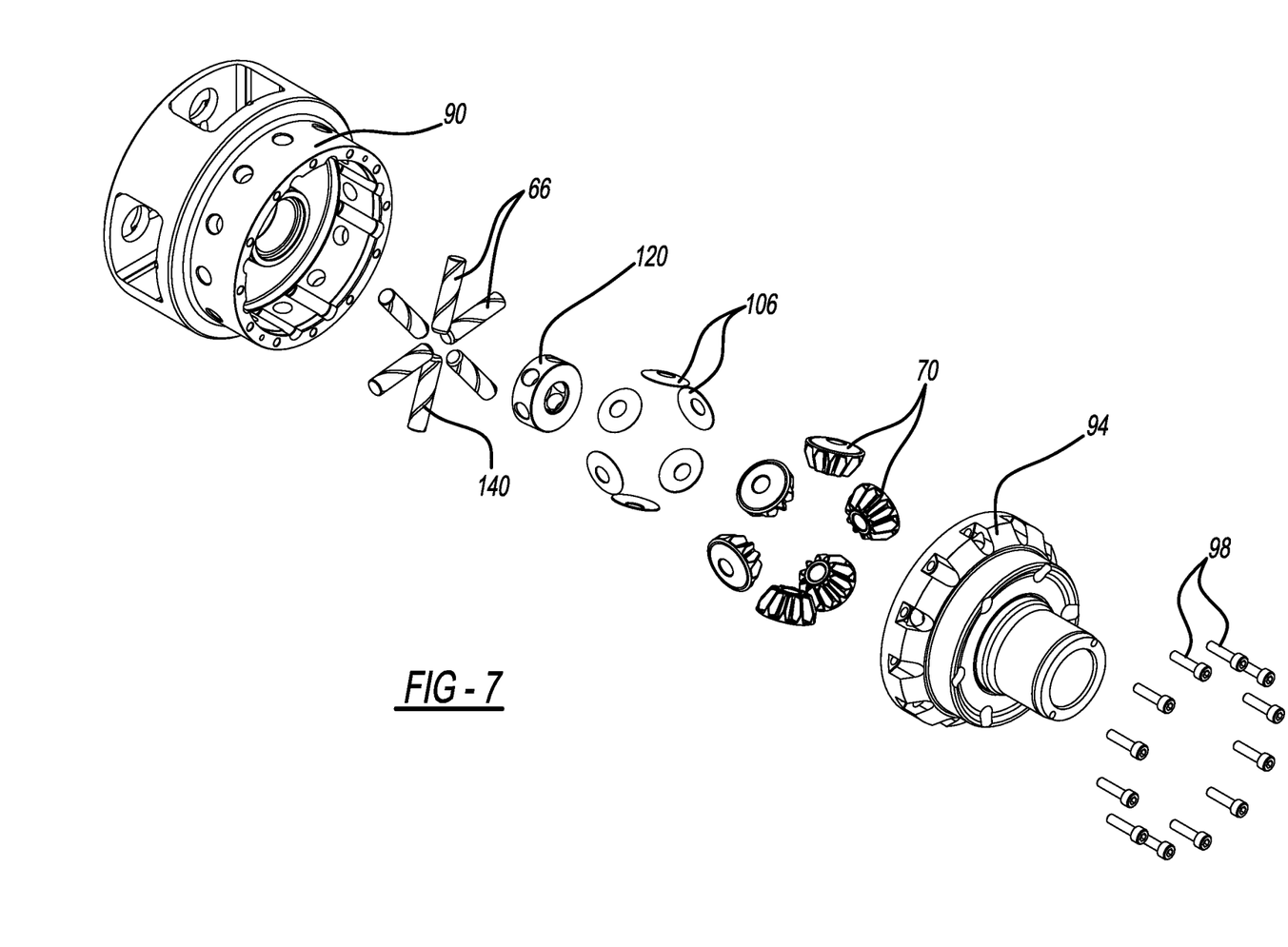
FIG. 7 is an exploded view of the differential gear assembly of the limited slip differential of FIG. 1.
Figure 8:
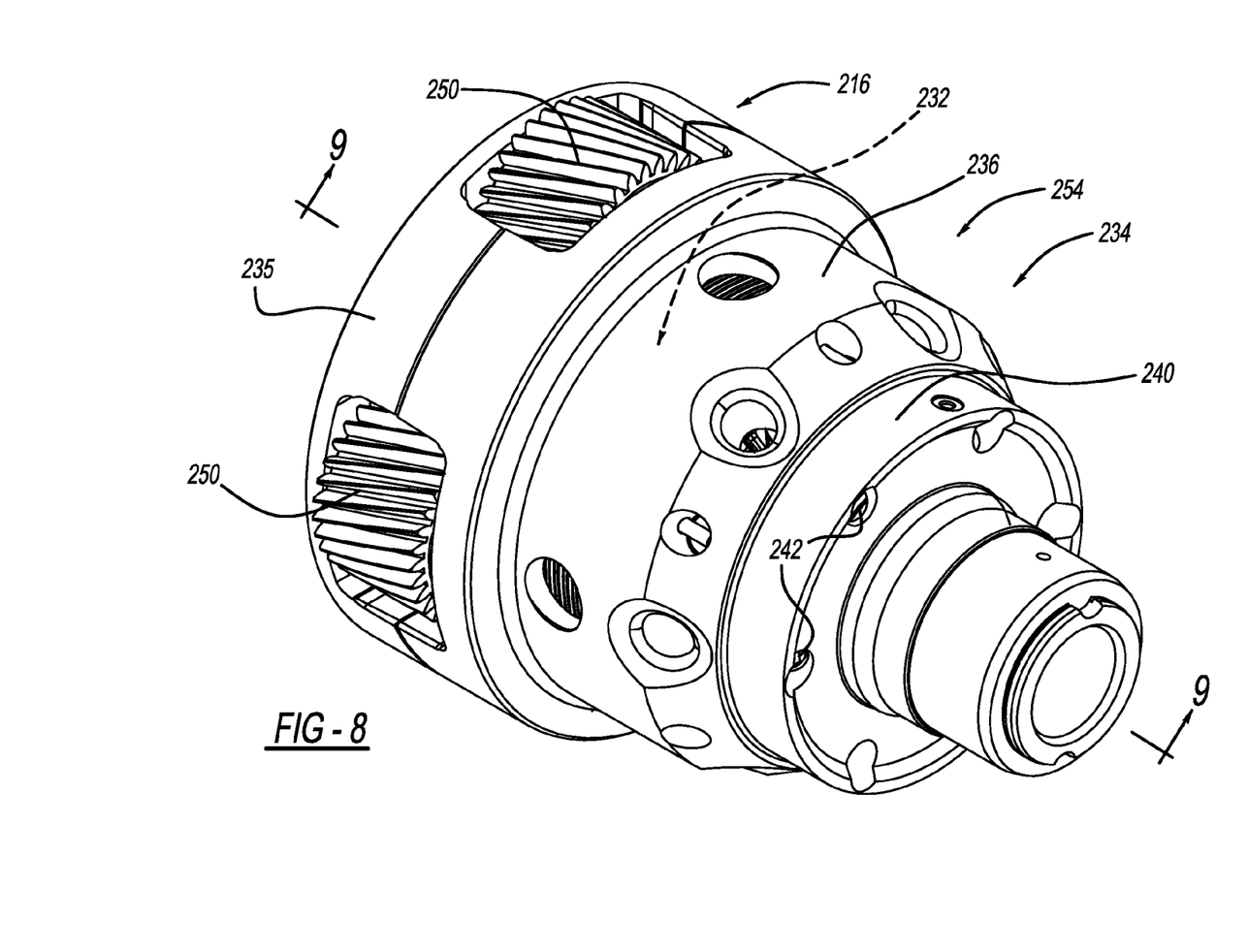
FIG. 8 is a perspective view of a limited slip differential constructed in accordance to additional features of the present disclosure.

Turning now to FIG. 7, a plurality of rings 106 can be provided between the respective pinion gears 70 and the first differential casing portion 90. A retainer 120 can be disposed in the differential case 54. The retainer 120 can retain the respective pinion shafts 66 relative to each other and within the differential case 54. The retainer 120 can include a center block 122. The center block 122 can include a ring-shaped member 126 that defines a plurality of openings 130 (FIG. 7).

Figure 6:
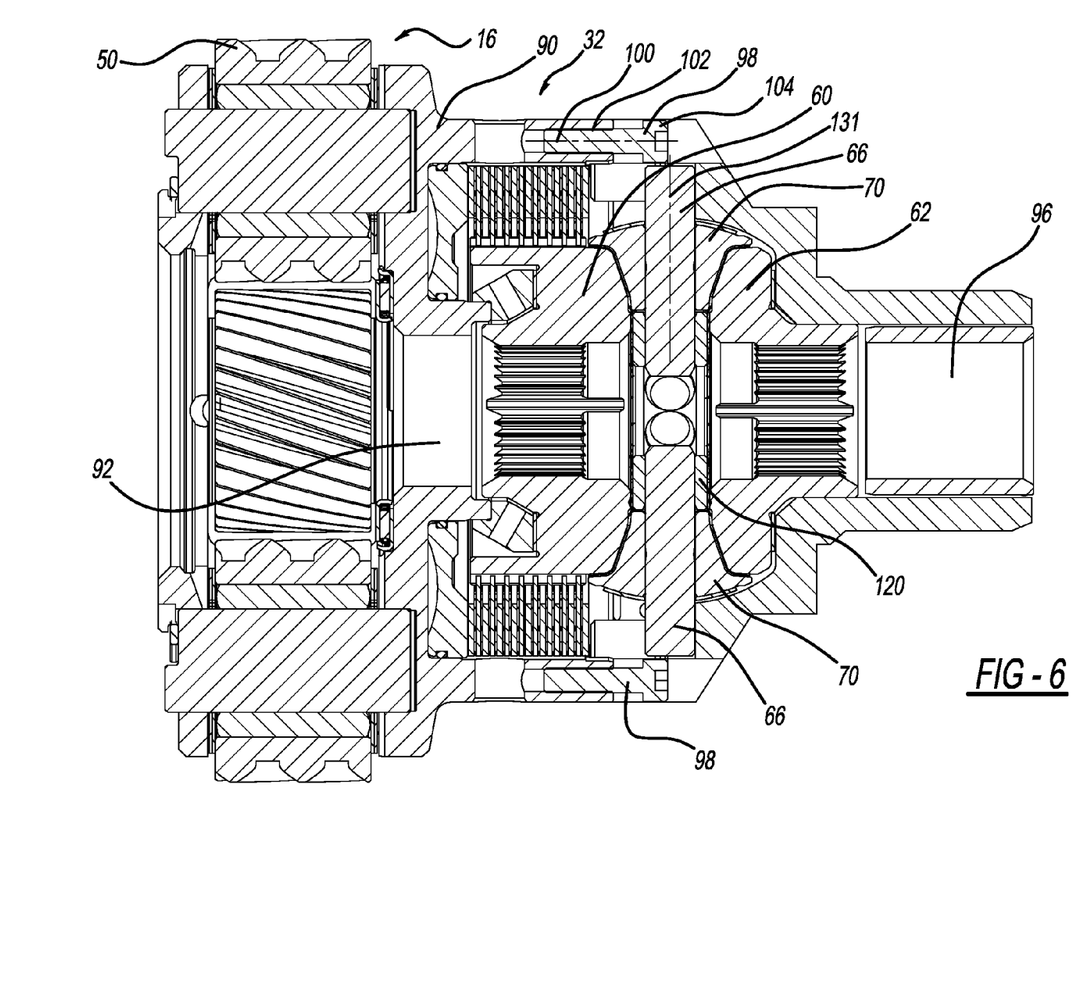
FIG. 6 is a sectional view of the limited slip differential taken along lines 6-6 of FIG. 4.

Each pinion shaft 66 can extend along a pinion gear axis 131 (FIG. 6). Each pinion shaft 66 can generally include a first end 132 (FIG. 5), a second end 134 and an intermediate portion 136 that connects the first and second ends 132 and 134. Each first end 132 can be aligned for contact with the corresponding fastener 98. Each second end 134 can be aligned for engagement with another second end 134 of an adjacent pinion gear shaft 66. In the example shown, each second end 134 has a beveled distal tip 138. It will be appreciated that a minimal amount of axial movement of the pinion gear shafts 66 may be permitted in the assembled position. In this regard, axial movement of each pinion gear shaft 66 along the pinion gear axis 131 may be confined by the respective fasteners 98 on first ends and adjacent pinion gear shafts 66 on opposite ends. The pinion gear axes 131 of the pinion gear shafts 66 can be perpendicular to the respective fastener axes 100. Each pinion shaft 66 can define a spiral groove 140 formed along an outer circumferential surface. The spiral groove 140 can facilitate oil flowing along the length of the pinion shafts 66.

Turning now to FIGS. 8-11 a limited slip differential assembly 230 constructed in accordance to additional features will be described. The limited slip differential assembly 230 can generally include a planetary gear assembly 216, a clutch assembly 232 and a differential gear assembly or mechanism 234. The planetary gear assembly 216 can be constructed similarly to the planetary gear assembly 16 described above. The planetary gear assembly 216 however can include a secondary planetary gear housing component 235. The secondary planetary gear housing component 235 can selectively couple to a first differential case portion 236 such as by fasteners 238. A second differential case portion 240 can selectively couple to the first differential case portion 236 such as by fasteners 242.

The planetary gear assembly 216 includes a plurality of planet gears 250 carried by a planet carrier 252. The planet carrier 252 is coupled for rotation with a differential case 254 of the differential gear assembly 234. Each of the planet gears 250 can be rotatably mounted to the planet carrier 252 by pins 256. The planetary gear assembly 216 can operate similar to the planetary gear assembly 16 described above.

The differential gear assembly 234 includes a pair of side gears 260 and 262 that are mounted for rotation with the axle shafts 40 and 42 (FIG. 1). The side gears 260 and 262 can define first and second axle shaft openings 264 and 265. A plurality of cross pins or pinion gear shafts 266 are fixedly mounted to the differential case 254. A corresponding plurality of pinion gears 270 are mounted for rotation with the pinion gear shafts 266 and are in meshing relationship with both of the side gears 260 and 262.

The clutch assembly 232 can operate in an open configuration to allow the side gears 260 and 262 to rotate independently from each other, e.g., at different speeds. The clutch assembly 232 can also operate in a closed or partially closed configuration where the side gears 260 and 262 rotate together or partially together (that is not independently), e.g., at substantially the same speed. The clutch assembly 232 can, for example, be a hydraulic clutch assembly that utilizes pressurized hydraulic fluid that can act on a piston 282 to selectively actuate a clutch pack 284 between the open, closed and partially closed configurations. The piston 282 can be disposed in a piston housing 286.

Figure 9:
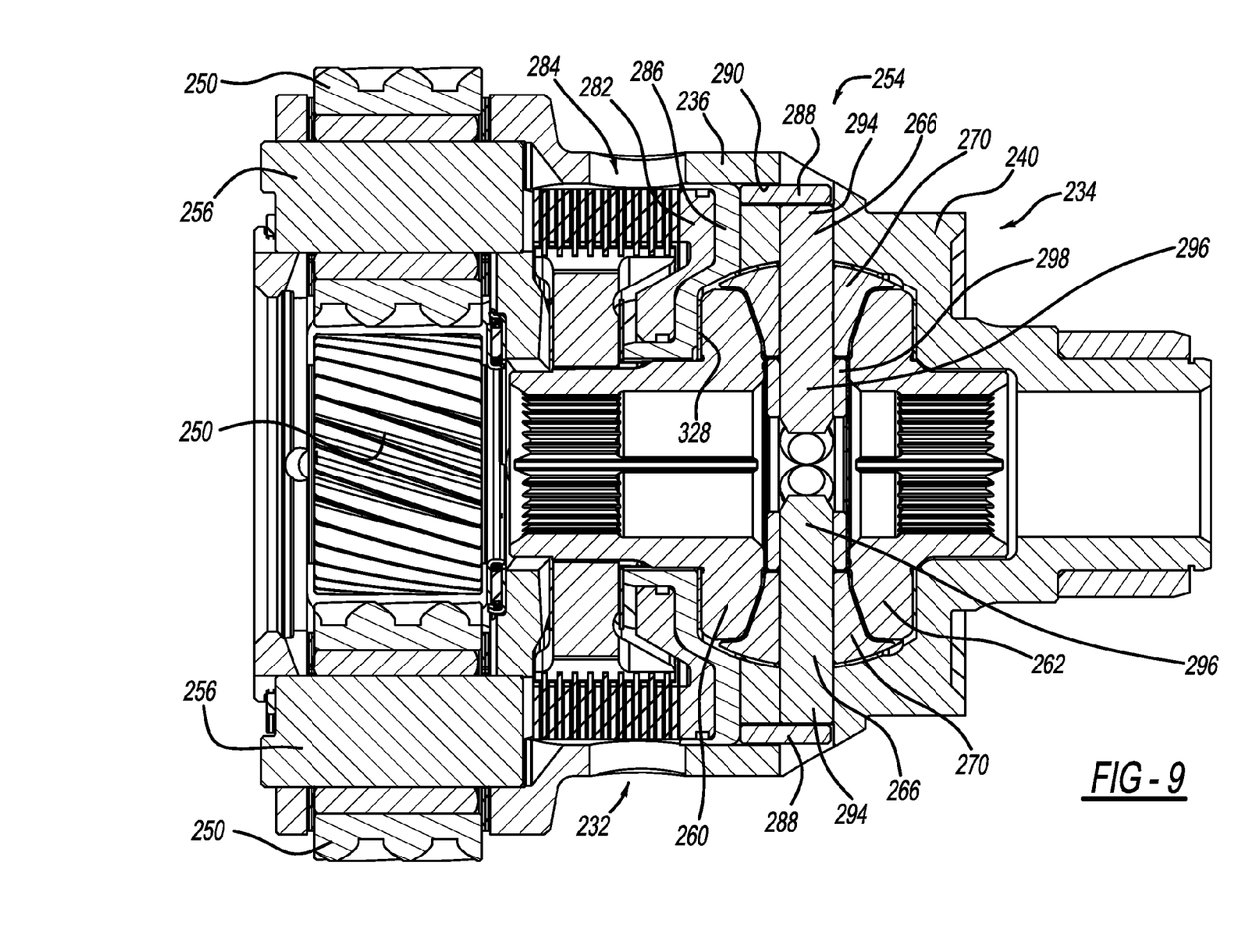
FIG. 9 is a sectional view of the limited slip differential taken along lines 9-9 of FIG. 8.
Figure 10:
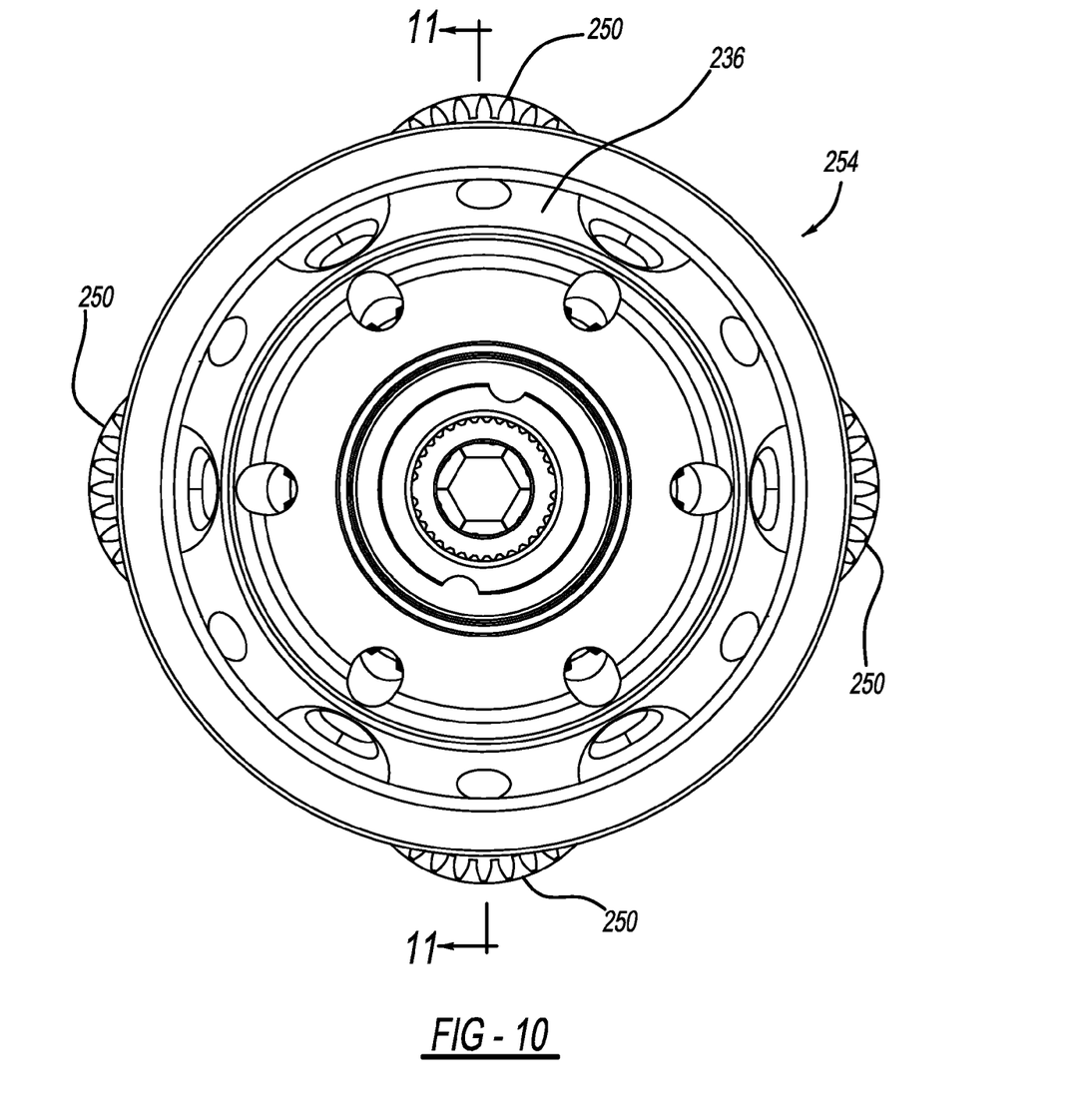
FIG. 10 is an end view of the limited slip differential of FIG. 8.

With reference now to FIG. 9, retention of the pinion gear shafts 266 within the differential case 254 will be further described. In one configuration, drop-in pins or pins 288 can be located into bores 290 defined in the first differential case portion 236. The drop-in pins 288 can bound the pinion gear shafts 266. Specifically, the drop-in pins 288 can bound first ends 294 of the pinion gear shafts 266. The drop-in pins 288 can be aligned with the pinion gear shafts 266 thereby inhibiting movement of the pinion gear shafts 266 out of the differential case 254. The drop-in pins 288 can each include a generally cylindrical body. In one example the drop-in pins 288 are each separately and distinctly formed.

Second ends 296 of the pinion gear shafts 266 can be disposed in a retainer 298. In one example, the pinion gear shafts 266 can be located relative to the first differential case portion 236. The drop-in pins 288 can then be located into the bores 290. The second differential case portion 240 can then be selectively coupled to the first differential case portion 236 by the fasteners 242 thereby capturing the drop-in pins 288 and the pinion gear shafts 266. The drop-in pins 288 can be positioned generally transverse to the pinion gear shafts 266.

In other examples, the drop-in pins 288 could be integrated into the piston housing 286. The drop-in pins 288 could alternatively be castellations forged or cast into the piston housing 286. Other configurations are contemplated.

Figure 11:
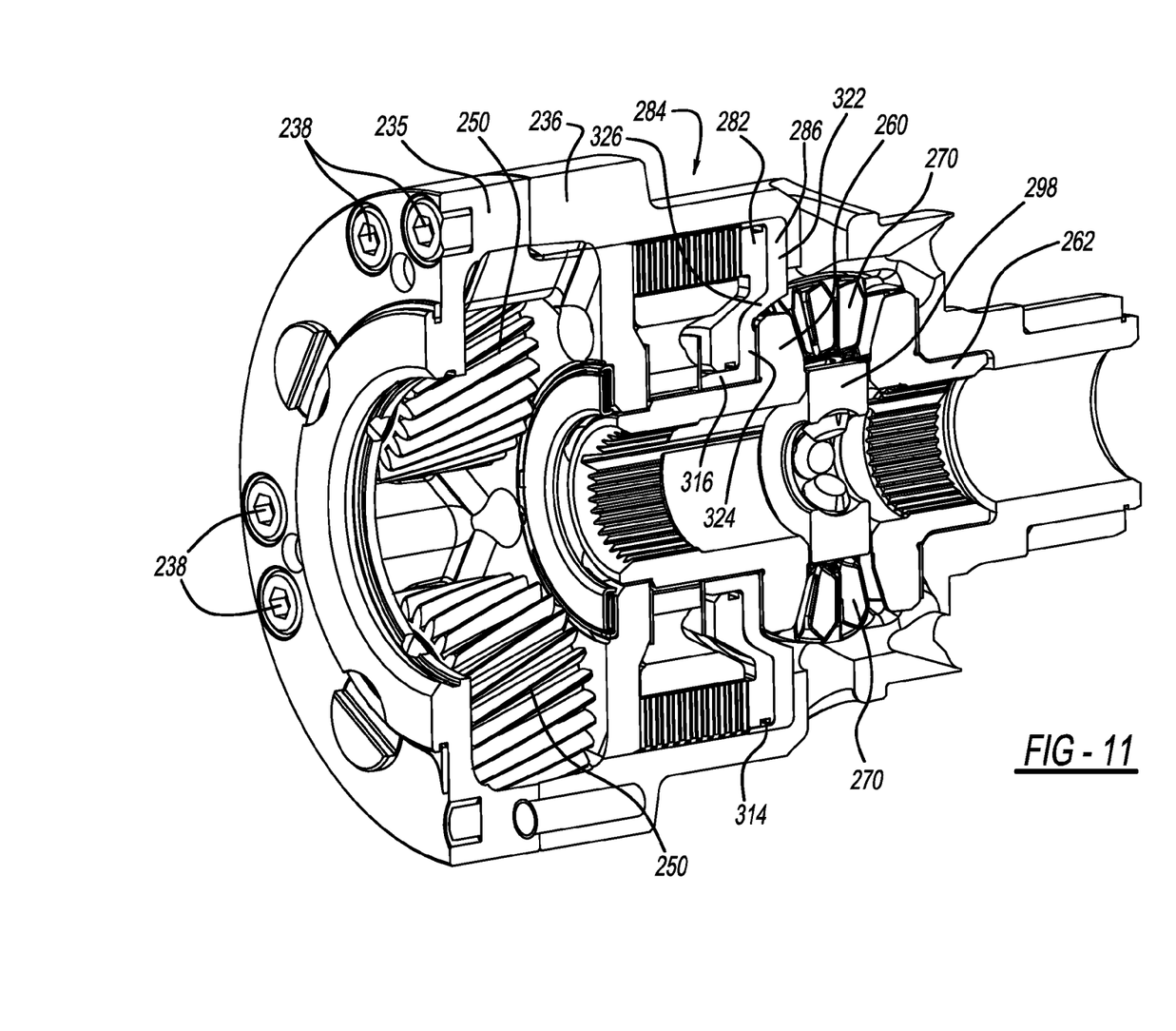
FIG. 11 is a sectional view of the limited slip differential taken along lines 11-11 of FIG. 10.
Figures 12, 13:
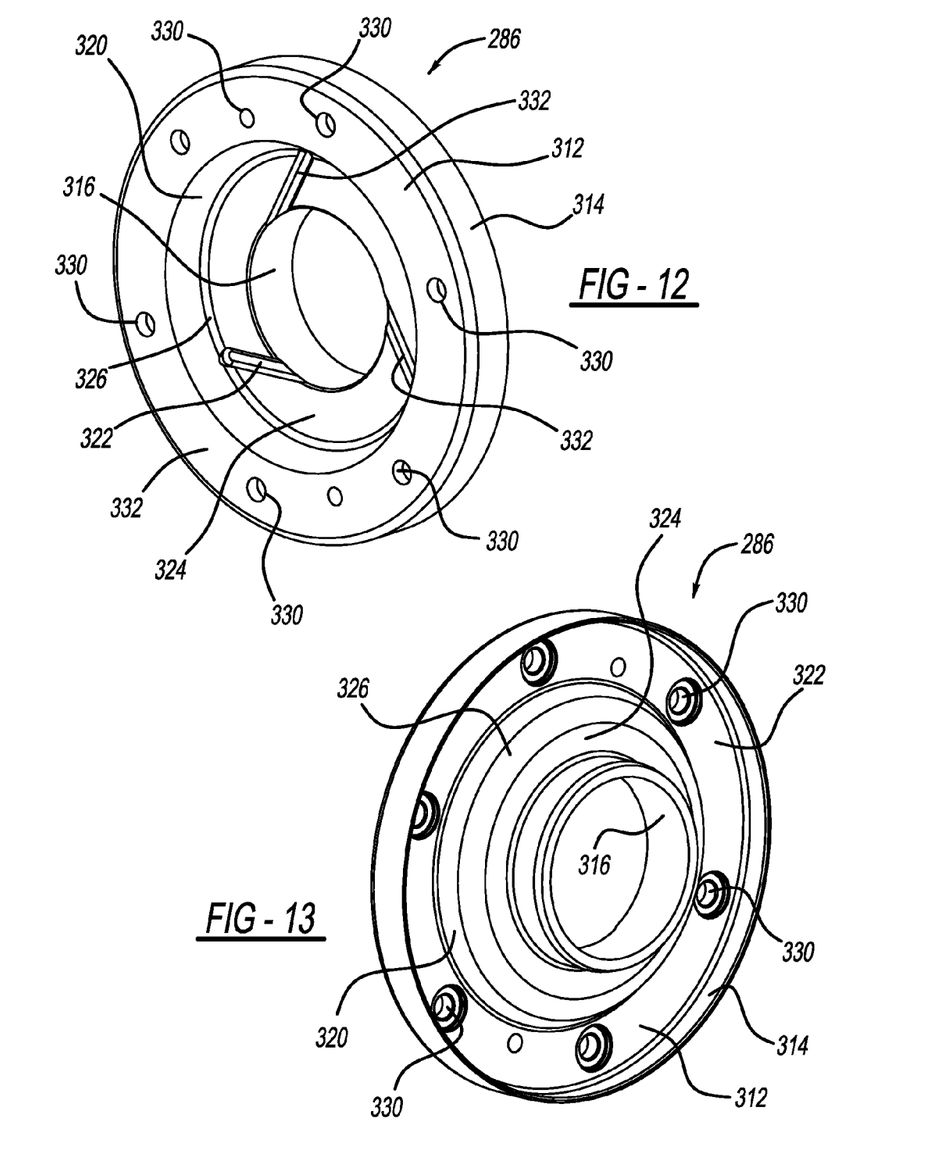
FIG. 12 is a front perspective view of a piston housing according to one example of the present disclosure.
FIG. 13 is a rear perspective view of the piston housing of FIG. 12.

Turning now to FIG. 11-13, the piston housing 286 will be further described. In the example shown, the piston housing 286 can be integrated with the side gear 260 case wall. The piston housing 286 can act as a case wall for the differential gear set (the side gears 260, the pinion gears 270). Hydraulic fluid can pass through a channel (not specifically shown). In addition, a bore exists in the piston housing 286 that allows the piston chamber to be pressurized. The piston housing 286 can include a housing body 312 that generally includes an outer annular flange 314, an inner annular flange 316, a collar 320, an outer ring 322 and an inner ring 324. In one configuration the outer annular flange 314 and the inner annular flange 316 are concentric. As shown in FIG. 9, the first side gear 260 is received by the inner annular flange 316. In this regard, the inner annular flange 316 opposes the first side gear 260. The piston 282 can be generally received by the piston housing 286 for slidable movement toward and away from the clutch pack 284 along the outer annular flange 314 and the inner annular flange 316. O-rings can be disposed between the piston 282 for sealingly translating along the outer and inner annular flanges 314 and 316, respectively of the piston housing 286.

A connecting surface 326 can connect the outer ring 322 and the inner ring 324. In one example, the connecting surface 326 can have a generally arcuate cross section to curve around the first side gear 260 (FIGS. 9 and 11). The outer ring 322 and the inner ring 324 can be generally parallel to each other. In one example a washer 328 can be disposed between the inner ring 324 of the piston housing 286 and the first side gear 260. The body 312 can define passages 330 formed through the outer ring 322. The piston housing 286 can be held in place by fasteners such as bolts that extend through the passages 330. The inner ring 324 can include grooves 332 to facilitate oil movement along the inner ring 324.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential gear mechanism comprising:
a differential casing defining first and second output shaft openings that are co-axially aligned along an axis of rotation of the differential casing, the differential casing having a first case housing portion and a second case housing portion, the first and second case housing portions coupled together with a plurality of fasteners;
a first and a second side gear rotatably mounted within the differential casing, the first and second side gears being co-axially aligned along the axis of rotation of the differential casing, the first side gear defining a first shaft opening configured to provide a first torque transmitting connection with a first output shaft received within the first output shaft opening, the second side gear defining a second output shaft opening configured to provide a second torque transmitting connection with a second output shaft received within the second output shaft opening;
a plurality of pinion gears mounted between the first and second side gears, each of the plurality of pinion gears being rotatably mounted on a respective pinion gear shaft, each pinion gear shaft having first and second ends, the plurality of pinion gears intermeshing with the first and second side gears to form a torque transfer arrangement configured for transferring torque between the pinion gears and the first and second side gears to rotate the first and second side gears about the axis of rotation, the torque transfer arrangement also being configured for allowing the first and second side gears to rotate at different rotational speeds with respect to one another about the axis of rotation; and wherein the first end of each pinion gear shaft is aligned with a fastener of the plurality of fasteners such that radial movement of the respective pinion gear shafts is inhibited by contact with a corresponding fastener of the plurality of fasteners.

2. The differential gear mechanism of claim 1 wherein each pinion gear shaft is aligned for engagement with an adjacent pinion gear shaft at the second ends.

3. The differential gear mechanism of claim 2 wherein the plurality of fasteners comprises a plurality of bolts each having a threaded shaft and a head portion.

4. The differential gear mechanism of claim 3 wherein the second ends of the pinion gear shafts are aligned with the head portion of the respective bolts.

5. The differential gear mechanism of claim 1 wherein the plurality of fasteners extend along respective fastener axes and the pinion gear shafts extend along respective pinion gear shaft axes, wherein the fastener axis and the pinion gear shaft axis of each corresponding aligned fastener and pinion gear shaft are perpendicular.

6. The differential gear mechanism of claim 1 wherein each second end of the pinion gear shafts are beveled.

7. The differential gear mechanism of claim 1 wherein the pinion gear shafts comprise three pair of pinion gear shafts, wherein each pair of pinion gear shafts includes first and second pinion gear shafts that are coaxial relative to each other.

8. The differential gear mechanism of claim 1 wherein at least one of the pinion gear shafts has a groove formed along an outer circumferential surface.

9. The differential gear mechanism of claim 8 wherein each pinion gear shaft has at least one groove formed along an outer circumferential surface.

\* \* \* \* \*